Patented Mar. 29, 1938

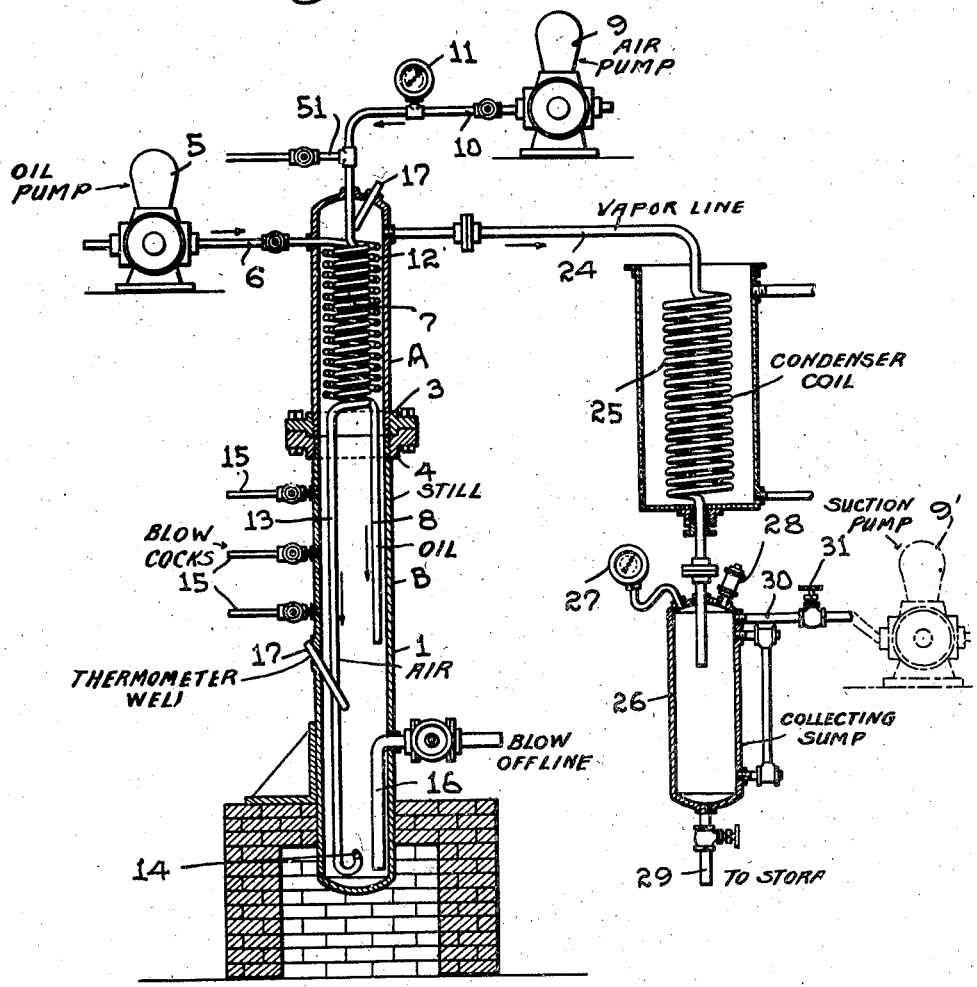
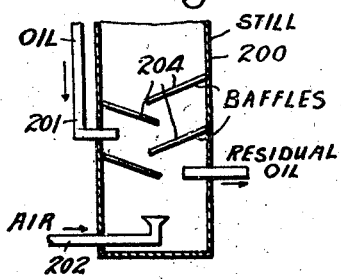

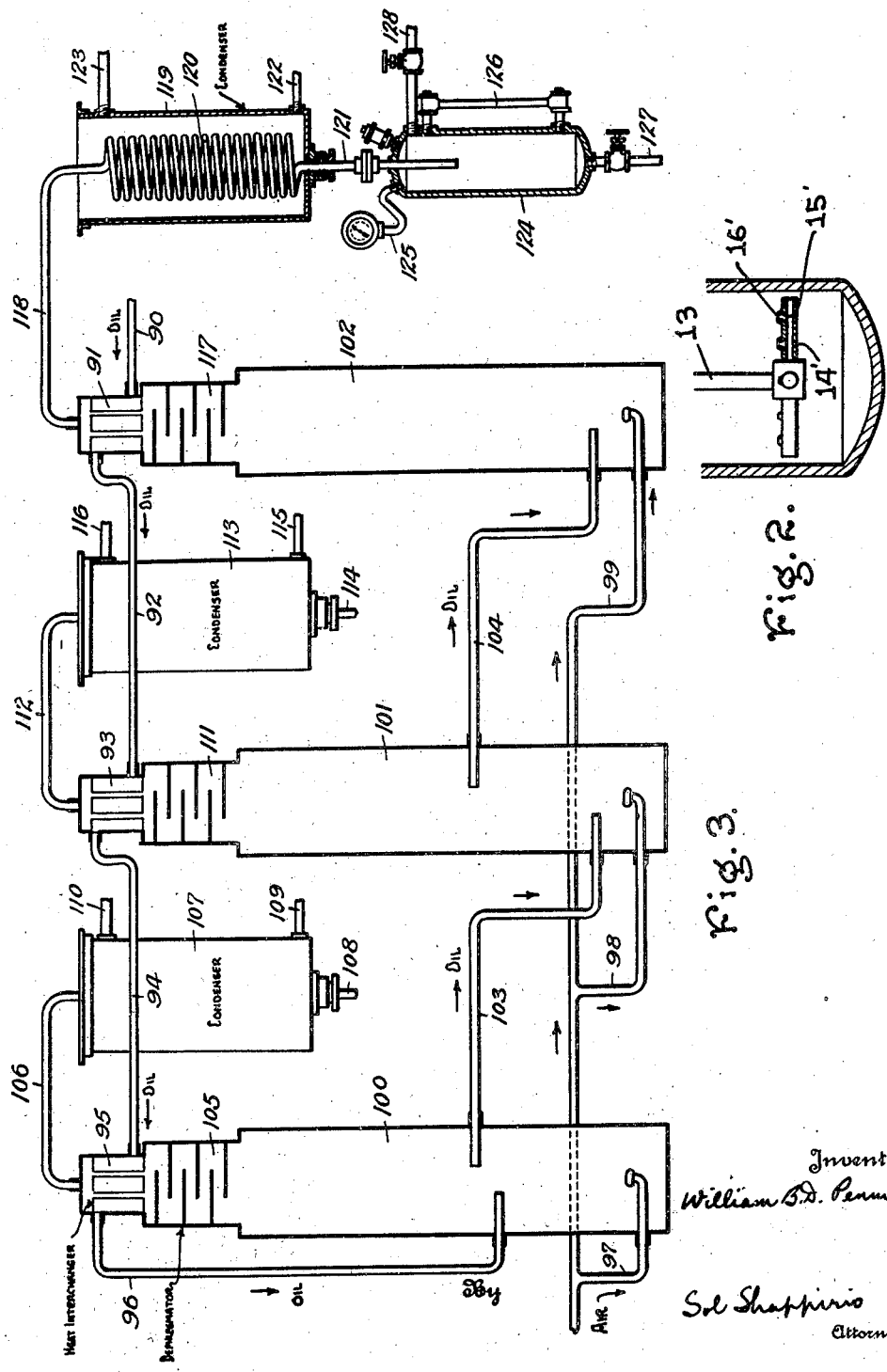

2,112,250

UNITED STATES PATENT OFFICE 2,112,250

PROCESS OF MAKING OXIDIZED PRODUCTS

William B. D. Penniman, Baltimore, Md.

Application July 7, 1925, Serial No. 42,107

9 Claims. (Cl. 196—49)

This invention relates to a method of oxidizing organic substances, especially mixed or composite materials such as oils, pitches, and tars rich in combined carbon, in a heated state and under a pressure not exceeding ordinary atmospheric pressure, employing as an oxidizing agent a material in gaseous form, preferably air, with the substance to be oxidized preferably present substantially in excess; whereby oxidation of a selective character instead of ordinary complete combustion is effected in large measure and products of great industrial significance result.

The invention further relates to such oxidation treatment of hydrocarbons, specifically those of the mineral or petroleum type. My process enables the production in varying proportions of alcohols, aldehydes, ketones, fatty acids, phenoloid bodies and solvents, a portion of such products being water-soluble and another portion insoluble in water. The water soluble portion includes such bodies as alcohols, ketones, and the like, and the water insoluble portion includes fractions useful as solvents, as motor fuel for internal combustion engines, varnish thinners for vehicles, and heavier water insoluble products or oils utilizable in various ways, for example, as burning oils, fuels, flotation oils, and the like. This application is a continuation in part of my prior applications, Serial Nos. 299,213; 526,707; 541,525, now U. S. Patent 1,922,322; 541,526; and 31,713, now U. S. Patent 2,044,014.

In accordance with the present invention, oxidized products are prepared by contacting an oxidizing gaseous medium with the substance to be oxidized under controlled conditions of temperature and pressure. Preferably the oxidizing gaseous medium, such as air, is passed through the substance maintained in a liquid condition. Under such conditions as will be more specifically hereinafter set forth, oxidation takes place in a predetermined manner and the products of oxidation or some portion thereof are volatilized and carried away by the current of spent gas; the nitrogen of the deoxygenated air thus serving as a stripping agent, assisting in removing the products from the zone of the reaction.

In the practice of my invention, the substances which I prefer to treat are those which exist in a liquid or sufficiently fluid state to allow air or other oxidizing gas to bubble therethrough under the desired temperature. Preferably, a deep layer or pool of the raw material in the liquid or molten state is employed, into which layer or pool air is injected or through which air is drawn, preferably near the bottom of the pool, thence bubbling upwardly through the hot liquid, thus supplying oxygen to the latter while bringing about a certain amount of agitation and creating a circulation thereof which enables all portions of the liquid to be brought advantageously into contact with the air jets or bubbles of air therefrom. It is, of course, possible to bring about agitation by special mechanical devices, although such means are not usually necessary in this process. For example, baffles may be interposed in the liquid layer to delay the upward travel of the air bubbles, furnishing obstructions to their course in addition to the obstructing effect of the liquid or any solid matter, such as carbon, which may be sustained therein. The layer or column of oil preferably should be deep enough to rather completely deoxygenate the air during the period of its travel therethrough. A layer of two or three feet in depth is found to accomplish this result, depending on the conditions of temperature and pressure maintained in the treatment zone. By complete or substantially complete deoxygenation in this manner, the inflammable vapors rising from the oil layer or column are not in contact with oxygen in any substantial amount, thereby eliminating a hazard of operation.

As noted, the substances which I particularly propose to treat are those rich in combined carbon and in general hydrocarbon mixtures of low grade, such as crude petroleum and its various distillates, shale products and tars, pitches, waxes, sludges and residues of the petroleum industry; asphaltic oils, malthas, asphalt, cracked oils and residues from cracking stills, wood tar oils and wood tars, peat distillates, lignite distillates and in some cases oils and tars resulting from the destructive distillation of coal; also oils, for example petroleum oil containing solid substances in suspension such as powdered coal, coke, peat and other oxidizable materials. Thus finely divided bituminous coal may be suspended in petroleum and subjected to the oxidation step as hereinafter described. Other substances, either solid or liqueflable by heat, may be added to the oil forming the basic raw material being oxidized. While ordinarily it is inadvisable to mix substances which are readily oxidizable with those which are oxidized under great difficulty, since the conditions of treatment should be varied to secure the most advantageous conversion, generally specific to each particular material undergoing treatment, the present process allows such mixtures to be treated with relative ease, particularly when, as in the mixtures set forth above, one substance may have a stimulating effect on the oxidation of the other.

A protracted series of experiments and tests have shown that the process herein set forth is especially applicable to the treatment of cheap petroleum oils in a liquid state, by bubbling air or other gaseous oxidizing agent through the same under controlled conditions of temperature, and so on. In this simple and efficient manner the preferred oxidizing condition may be established, in accordance with which the oil to be oxidized is present in predominant proportions; preferably being fed continuously into the charge in the oxidizing zone; thus reducing to a minimum the occurrence of ordinary destructive combustion, allowing the formation of valuable products of oxidation and substantially eliminating the hazard of explosive conditions which might prevail should oxygen be present in predominating proportions. In view of the richness of petroleum in combined carbon and the adaptability of the process to the treatment of petroleum (mineral oils) and petroleum products in general, as noted above, I consider the controlled oxidation of petroleum to represent the preferred embodiment of the present invention. Hence the illustrations hereinafter given include petroleum as the typical raw material. The term "petroleum", however, is employed in a generic sense to embrace mineral or earth oils and solid hydrocarbons.

When the process is applied to certain petroleum oils containing a considerable proportion of sulphur, the oxygen may serve in part as a desulphurizing agent and in part as an oxidizing agent forming sulphur dioxide from the sulphur. Thus distillates of relatively low combined sulphur content may be obtained. This reaction tends to simplify refining operations involving the elimination of sulphur. The sulphur dioxide may be collected and converted into bisulphite solution or into any other suitable form. As bisulphite, it may be used to extract ketones or aldehydes in the subsequent operation of treating and separating the useful products of operation. To the extent that sulphur is oxidized in this manner, heat is developed in the oxidation zone and assists to the same degree of its development in the maintenance of the temperature of the reaction chamber. Hence, oxidation reactions of this character are advantageous not only from the standpoint of effecting desulphurization but also that of obtaining heat useful in the operation through the destruction of a deleterious substance. Any heat developed in this manner will lessen the heat required to be developed through the oxidation of desirable hydrocarbons. In some cases sulphur may be added either for its calorific or chemical effect.

In the practice of one phase of my invention, attention is particularly called to the possibility of oxidizing finely divided carbon formed as a part of the general oxidation process applied to petroleum and the like. In this way, a certain amount of heat may be supplied to the reaction chamber while eliminating some of the carbon which otherwise would remain in the spent sludge or tar drawn from the oxidation chamber. In passing, it may be noted that the cracking of heavy petroleum oils in direct fired stills gives much trouble through the separation of carbon which adheres to the bottom of the still and forms a graphitic layer causing overheating and burning out of the still bottoms. In the present invention such carbon as is formed will, at the time of its liberation, be in a very finely divided state which, no doubt, is colloidal in part at least, and the oxygen containing gas passing up through the oil column comes in contact with these particles and is adsorbed. As a result the carbon may thus be oxidized selectively in greater or lesser degree, yielding a quota of heat for the maintenance of the temperature of the reaction zone. To the extent that heat is thus supplied by the oxidation of carbon useful work is performed. If the object is to secure from petroleum a substantial poportion of lighter hydrocarbons and a minor degree of oxidation, the heat supplied by the combustion of carbon calls for less oxidation of the hydrocarbons themselves. With this tendency to oxidation of the very fine colloidal carbon I have, therefore, the opportunity of filtering the tar or spent oil withdrawn from the oxidation zone, thus removing the coarser carbon which may be present and returning the filtered oil to the oxidation chamber.

There exists within the range of utility of my process the step of treating the residual oils from ordinary cracking stills; oils which have already been subjected to drastic treatment under heat and pressure for the purpose of obtaining the maximum amount of so-called cracked gasoline. Spent oils of this character which can no longer be disintegrated by ordinary pressure cracking methods may be subjected to oxidation treatment in accordance with my process to yield products of cleavage and oxidation. Fresh petroleum oil may, if desired, be added to such spent oil before subjecting the latter to oxidation.

As is apparent from the foregoing, the oxidizing agent employed is preferably ordinary air, utilized without drying or modifying the normal moisture content as it may vary from time to time. Or it may be dried, if desired, to a uniform degree of humidity. Likewise, for special purposes, moisture, for example as steam, may be introduced with the air current. Such dilution with steam or diluent gases, such as products of combustion, or with deoxygenated air discharged from the condensing apparatus, may be used where the introduction of air into the treatment zone yields too drastic a degree of oxidation. The enrichment or impoverishment of this entering air is also determined by the character of the oil or the products needed. On the other hand, when treating highly resistant organic material, such as spent oils, from cracking stills, or for securing deep-seated oxidizing effects, the air may be enriched with oxygen. Pure oxygen obtained, for example, by the liquefaction of air could be used in this manner. Air at ordinary atmospheric temperatures may be used, but in most cases I prefer to preheat the air to a considerable degree. The temperature may be further increased in some cases by having the air travel through a heat interchanger before entrance into the reaction chamber. The heat interchanger may be arranged to utilize some of the heat of the outgoing gases and vapors. In some cases a coil may be placed in the upper part of the reaction chamber through which the air travels before entering the oil. The air thus preheated is introduced into the oxidizing chamber, preferably in the lower part thereof, where it passes through a column of oil, preferably through distributing devices allowing the air to pass up into the oil in the form of fine jets or bubbles. On entering the oil the air bubbles encounter the resistance of preferably a deep column of said oil and this obstructing effect is oftentimes enhanced by the presence of carbon or other solid materials. The fine bubbles of air therefore may travel rather slowly upward through the pool of oil. As previously noted, the rate of travel may be retarded to an additional degree by the employment of baffles or other devices arranged to hinder such upward flow. If the baffles are arranged in a manner to bring about a circulation of the oil which tends to cause the carbon and other separated solid material to collect to a considerable degree in the lower part of the reaction chamber, this is advantageous as the tarry material or heavy liquid products remaining from the reaction may be drawn off at the lower part of the chamber, either continuously or intermittently, as desired.

Variations in the gaseous oxidizing agent, for example by dilution with air or enrichment with oxygen, the influence of temperature, etc., enable the oxidation and other chemical changes to be oriented to a considerable degree despite the complexity of such bodies as petroleum and other oils. In the cleavage of hydrocarbons of high molecular weight when exposed to heat, while accompanied by exposure to oxidizing agents, products of lower molecular weight, some of which are more stable than others, will form. There is, therefore, a tendency for the more stable bodies to accumulate. If sufficiently volatile these will be carried away in the stream of deoxygenated air to the condensers or adsorbers. If non-volatile under the conditions of treatment, they may remain unchanged in the oil and be drawn off with the sludge, from which such products may be recovered by suitable treatment. Or yielding to further and continued oxidation they may break down further. Under one set of conditions a maximum yield of water-insoluble products containing a substantial proportion of components available for motor fuel purposes will result, whereas under a different set of conditions there may be an increased yield of more highly oxidized products, for example those of a water-soluble character such as the lower fatty acids, lower aldehydes, solvents and the like.

Chemical oxidizing agents such as metallic peroxides, hydrogen peroxide, bichromates, permanganates and the like, are very costly, while others less expensive such as bleaching powder, nitric acids, etc., are liable to bring about objectionable secondary reactions, such as chlorination, rapid corrosion of containers or formation of explosive nitro-compounds. In my preferred process a cheap oxidizing agent, namely air, is used with the derived advantages of the availability of the oxidizer, simplicity of treatment and relative freedom from objectionable or destructive side reactions.

In using pressures which may be substantially lower than ordinary atmospheric pressure, it will be found that for each substance there exists a critical pressure, or more strictly, a critical range of pressures yielding a maximum proportion of specially desired products of oxidation. Beneath this range inadequate yields or indifferent results appear, while above the range there is danger of destructive effect, through condensation, polymerization, etc. If the raw material is very cheap such a degree of destruction is not always as serious, since other effects such as the spontaneous development of heat useful in the reaction or elimination of some impurity, for example sulphur or carbon, may determine the conditions to be imposed, and pressures within the critical range at the desired temperature may therefore not always be necessary. Approximation of this range is, however, generally desirable. Similarly there exists a critical temperature or range of temperature at or within which the maximum yield of particular products may be exposed. In some cases this range is a broad one, for example between 300 and 1000° F. A narrower and more effective range is that between 600 and 900° F. For the treatment of petroleum oils to obtain oxidized products and especially motor fuels substantially free from knocking qualities when used in combustion engines, temperatures between 700 and 850° F. are preferably employed.

Briefly restated, the process, in one desirable form thereof, is that of passing air under critical conditions of control through the substance being oxidized, present in a liquid form or as a suspension in an appropriate or molten material, and separating from the spent air current the desired products of oxidation and entrainment.

From the residues of oxidation, products which are non-volatile under the pressure conditions imposed, or are not entrained by the spent air current but which have been oxidized to a degree that they constitute chemical derivatives of value, may be separated by appropriate extraction methods.

The entrainment action of the air current serves to remove from the oxidation zone materials which have been sufficiently oxidized, while products of higher molecular weight and of lesser volatility remain in or are returned to the zone of oxidation for further conversion. The spent air current or deoxygenated air, therefore, acts as a stripping out or purging agent to remove the lighter bodies from the zone of oxidation and to prevent destructive oxidation to such ultimate products as carbon monoxide, or carbon dioxide. With some substances pressures greatly below atmospheric may bring about little or no action and the oxidation would proceed at so slow a rate that the process would have little commercial interest. But the use of lower pressures may prove desirable to prevent extensive oxidation and therefore allow the recovery of a greater amount of lighter materials than in those gases where pressure oxidation is used.

Aside from the fact of any finely divided carbon present in the oil, there may be added special activating substances such as aluminum chloride, the oxides of manganese, lead, iron, chromium, vanadium, zinc, copper, or calcium and the like, to assist in the oxidation; such substances ordinarily being introduced in small or sometimes often catalytic proportions. Larger amounts of alkaline substances or bodies having a neutralizing effect, such as quick lime, lime stone, or carbonated alkali, may be added in some cases. In general, however, for carrying out the reaction on petroleum oils catalytic or activating substances are not required. This is especially true when treating native petroleum or its fractions which have been unchanged by cracking or otherwise. Catalysts, however, sometimes may be used more advantageously on rather resistant coal tar distillates, spent oils from cracking stills, and similar raw materials which have experienced treatment which tends to render them normally more stable and therefore less easily attacked by oxygen.

The oxidizing chamber may be of heavy steel plate which, if desired, may be of chromium steel or chromium nickel steel or other material fairly resistant to the attack of sulphur, sulphur dioxide and organic acids. The chamber is preferably cylindrical with concave or convex heads. In appearance it may resemble an ordinary direct-fired oil still. The cylinder may be placed horizontally or vertically. In the latter position a single distributor placed at or near the bottom will ordinarily serve for the admission and distribution of the air. In the horizontal form the air may be introduced through a perforated pipe situated along the bottom and extending from end to end of the oxidation chamber. The movement of air upwardly through the oil causes the latter to circulate first upwardly, then outwardly toward the walls of the vessel and finally downwardly toward the source of air supply. Such circulation is effective in bringing about good contact between the oil and the air supplied to it. The air jets may also be so arranged that the movement of oil within the still is such that the heavier products are segregated in a selected portion of the still itself or an attachment thereto.

There need be no fire box or other provision for continuously heating the oxidizing chamber. The latter is preferably a "fireless still", the temperature of which is maintained solely by the heat of oxidation generated within the thick layer or column of oil or preferably jointly by the heat of oxidation and the heat supplied by the compression of the air supply; or by specially fired preheaters for the oil and/or air.

However, oxidizing chambers equipped with fire boxes may be used if desired. The latter, for example, may prove desirable during the initial or "starting up" stage. When the oil has been heated sufficiently so that the oxygen of the air will react with it, the current of preheated air may be started and heat is thenceforth spontaneously generated in the oil. Thereafter, the fire on the grate may be kept at a low point or allowed to subside entirely.

Using a "fireless still" without fire-box equipment, the oil may be heated in a convenient receptacle to a temperature of, say, 500 or 600° F. and then charged into the oxidizing chamber. Air, preferably preheated, is then introduced and the oil begins to oxidize, the temperature running to, say, 700 or 750° F. and remaining at that point by adjustment of the air supply, the degree of preheat thereof and the continuous introduction of preheated raw oil. In short, once an initial charge of oil has been heated to oxidizing temperature in a chamber continuously supplied with oil, no further application of heat by means of fire-box appurtenances is required.

The employment of a continuous feed of raw oil is advantageous. The level of the oil in the oxidizing chamber may thus be kept fairly constant, thereby maintaining a column of oil of deoxygenating depth; that is, of a depth sufficient to permit of the removal from the air supply of all or most of its oxygen during the course of travel from the point of its ingress to the surface of the oil. It is desirable, also, to withdraw a portion of the oil continuously from the reaction pool, preferably from the lower part. The rate of withdrawal may be adjusted with respect to the rate of feed of the oil into the chamber to avoid departing materially from a constant level. Instead of continous fed and discharge, the operation may be intermittent "portionwise", e. g. frequent alternation of feeding in portions and withdrawing the portions without substantially disturbing the constant level conditions of the reaction pool.

The introduction of fresh raw oil into the still serves to maintain a degree of constancy of oxidizing conditions which is desirable. The contents of the chamber remain more uniform than when a charge of oil is placed in a receptacle and is passed therethrough until action substantially ceases. With continuous feed of oil or its equivalent, the air is at all times acting on a mixture of fresh oil and of oil which has been modified through reaction. Continuous introduction and withdrawal thus suffice to obtain that relatively constant composition which is important in securing uniformity of heat development and effective supervision of the apparatus.

The intermittent or batch process yields constantly changing conditions as oxidation progresses and finally may come substantially to a standstill. In this case, the conditions of operation are constantly changing and there is less effective control with variable conditions of heat development. Therefore, while certain features of the present invention may be practiced by the intermittent process, it is not considered to be the most desirable.

The continuous feed of oil also brings about a safer character of operation in that there is always present an abundance of fresh raw oil to which the oxygen has access and therefore the risk of collection of an excess of oxygen at any one point to bring about violent local reactions is minimized. The employment of an "average pool" of oil therefore constitutes what I consider to be a very desirable feature of the preferred form of my invention.

Condensation of the vapors is preferably carried out under pressure normally approximating the pressure used in the oxidizing chamber. Condensers may therefore be in open communication with the oxidizing chamber and such pressure drop as may be observed in the different parts of the condensing apparatus will be simply that due to condensation and loss of pressure by friction. However, there may be provided a shut-off valve or a check valve between the still and condensers of the several sections of the latter to cut off any desired units or to reduce the pressure therein. The use of silica gel, absorbent carbon or similar absorptive agent is considered to be advantageous in the treatment of the tail gases to remove residual vapors such as light aldehydes and very volatile hydrocarbons. The tail gases thus treated will be found to contain a very high proportion of nitrogen which may be purified and used in admixture with hydrogen to make synthetic ammonia.

When properly deoxygenated the tail gases will contain little or no oxygen, carbon dioxide will be present in moderate amounts and sometimes a small proportion of carbon monoxide will be present.

The condensate is acid due to a variety of organic acids, which may include formic, acetic, propionic, butyric and higher fatty acids of this series, also unsaturated acids, such as acrylic, aromatic acids, e. g. phthalic acid or anhydride. Sulphur dioxide may also be present. Hence, I prefer to construct condensers, or at least that portion in which the acids condense, of material such as copper, chrome steel, nickel chrome steel, Monel steel, and the like, notably resistant to organic acids. The employment of enamel-lined condenser tubes is not precluded.

The products of oxidation, distillation, and condensation as noted will be found to be made up of an emulsion which may stratify to form an upper layer of oily character and a lower layer of a water solution of organic substances. The emulsion or two layer condensate may be charged with gas, particularly when pressure condensation has been used. The upper layer which contains water immiscible substances is hereinafter referred to as "motor distillate." Each of these distillates may be worked up in a number of ways to produce valuable commercial products. As previously indicated, the character of the distillate is determined by a number of factors, the most important of which are indicated below:

First, character of hydrocarbon used;
Second, pressure maintained in the still;
Third, rate and rapidity of the entering air and any additions thereto;
Fourth, the temperature maintained in the still;
Fifth, the temperature maintained in the reflux head; and
Sixth, the mode of condensation.

The products of oxidation, distillation, and condensation thus obtained are hereinafter referred to as "oxygenated and disintegrated" products.

Apparatus which may be desirably used is shown in the accompanying drawings, wherein—

Fig. 1 is a diagrammatic section or elevation;
Fig. 2 is a modified form of air nozzle;
Fig. 3 is a diagrammatic sectional elevation of a modified arrangement of the apparatus elements; and
Fig. 4 is a fragmentary view of a still portion in section showing a baffle arrangement.

Referring to Figure 1, the apparatus consists of an upright still or drum, preferably made in two sections, A and B, secured together by means of companion flanges, 3, 4, and suitable bolts. The still is mounted above a gas-fired furnace of any suitable construction. Oil is introduced into the still by a pump 5 from which a delivery pipe 6 leads, the delivery pipe continuing within the still head as a coil 7 and a depending delivery pipe 8. When operating at ordinary atmospheric pressure air may be forced into the still from a pump 9 at sufficient pressure merely to overcome the head of liquid in the still, such air passing through pipe 10 and coil 12 (within the still), and depending pipe 13 provided at its lower end, which is near the bottom of the still, with an upwardly directed delivery nozzle 14. Blowcocks 15 enable the level of the oil in the still to be ascertained. A blow-off line may be provided through which residual material is removed. 17, 17 are thermometer wells. 24 is a vapor line leading to a condenser coil 25, which is connected to collecting sump 26. The liquid collected in tank 26 is delivered through pipe 29, suitable storage or collecting vessels, of course, being connected to pipes 29 and 30. The residual gases pass out through pipe 30. When operating at pressures below atmospheric in place of the pump 9 and its associated elements, a suction pump 9' may be attached to the pipe 30 through which the effluent gases pass, a valve 31 controlling the degree of pressure maintained in the apparatus.

Only one air delivery pipe has been shown but as many more as are necessary may be used in stills of larger diameter than that shown. A modified form of air nozzle is shown in Figure 2, in which a number of radiating pipes 14', provided with apertures in their upper surfaces, are secured to the end of the air pipe 13. These apertures 14' are preferably formed by tapering nozzles 15' having their small cross-sectional area at the outer or delivery end 16' of such nozzles. With this construction there is no tendency toward accumulation of carbon in these nozzles and no localized heat accumulation due to secondary combustion of such accumulated carbon.

In Figure 3 there is shown a battery of stills comprising a plurality of reaction chambers, dephlegmators and heat interchangers connected to condensers. As shown in Figure 3, provision is there made for a multi-stage oxidation treatment. Oil entering through the pipe 90 may pass as shown through the heat interchanger 91, where it is preheated, from which heat interchanger, it passes through the pipe 92 through the second preheater 93, and from the latter through pipe 94 through the third heat interchanger 95, from which it enters the still 100 through the pipe 96. The incoming air supply is shown with three air inlets 97, 98 and 99 respectively, for introducing air into the successive reaction chambers. In the initial reaction chamber 100, the oil is subjected to the first treatment by means of the air entering from pipe 97. The vapors and gases and other reaction products which are generated in this initial reaction still 100 pass through the dephlegmator 105, where heavier bodies are removed and returned to the reaction zone in the still 100, while the vapors and gases pass through the heat interchanger 95 and out through the exit pipe 106 into the condenser 107. The cooling fluid for the condenser 107 enters through the inlet pipe 109, and passes out through the pipe 110. Condensates formed in the condenser 107 may be withdrawn through the pipe 108.

Residual oil from the first reaction zone 100 may be withdrawn through a pipe 103 from which it enters into the second reaction still 101, where it is contacted with air entering through the pipe 98. Vapors and gases generated by the reaction in still 101 pass up through the dephlegmator 111, where heavier bodies are returned to the reaction zone in still 101, the remaining vapors and gases passing through the heat interchanger 93, and out through the pipe 112 into the condenser 113. Condensate formed in the condenser 113 may be withdrawn at the outlet 114. The cooling fluid for the condenser 113 enters at the inlet pipe 115 and passes off at the exit pipe 116.

Residual oil in the second reaction still 101 may be withdrawn through pipe 104 for treatment in the third reaction zone or still 102, where it is contacted with air entering through the inlet pipe 99. The products formed in the reaction zone 102 pass up into the dephlegmator 117, where heavier materials are returned to the reaction zone 102, the remaining gases and vapors passing through the heat interchanger 91, and out through the exit pipe 118 into the condenser 119. Condensers 107, 113, and 119 are similar, and the drawings specifically illustrate the character of these condensers, where as shown in connection with the condenser 119, a condenser coil 120 receives the gases and vapors from pipe 118, these materials from the reaction zone being subjected to the action of the cooling fluid which enters condenser 119 through inlet pipe 122 and passes out through exit pipe 123. Condensate, vapors and gases, etc. in the condenser 119 are withdrawn through the pipe 121 into the collecting chamber 124. The condensate liquids are thus collected in the collecting chamber 124, while any residual vapors and gases may be withdrawn through the valve outlet pipe 128, the condensate itself being withdrawn through valve pipe 127. A pressure gage 125 is provided on the collecting chamber 124, as well as a sight gage 126.

There may be as many stills used as may prove desirable, depending on the character of material undergoing treatment and the conditions of treatment to which it is subjected. In using such multi-stage oxidation treatment, the conditions prevailing in each chamber need not be identical. For example, the temperatures in the succeeding chambers may become progressively higher by increments of, say, 50° F. Further, the pressures in the succeeding stills need not be the same. For example, the oil undergoing treatment may be subjected to superatmospheric pressure at the desired temperature in the initial still. From this still the residual oil then passes into the next succeeding still where it may be subjected to treatment under pressure less than that in the initial still, and so on through the battery of stills. In this way, the pressures in the stills may vary from superatmospheric pressure in the initial treatment still or stills to subatmospheric pressure in the final still or stills. Or, if desired, the treatment of the oil in a series of zones of varying pressures may begin with the use of subatmospheric pressure at the desired temperatures in the initial still. From this still the residual oil is then pumped into the next still where it may be subjected to superatmospheric pressure treatment, and so on through the battery of stills. In this modification the pressures in the stills would vary from subatmospheric pressure in the initial treatment still or stills to superatmospheric pressures of several hundred pounds, two hundred pounds or higher, for example, in the final treatment stills. When using high pressures, the stills in which such treatments are carried out should be designed to withstand high pressures as more specifically set forth in my copending application, Serial No. 31,713, now U. S. Patent 2,044,014, of which prior application the present application is a continuation in part. The gaseous and vaporous products from the several treatment stills may be combined for treatment, but when using varying pressures in the several stills, it is desirable to treat the products from the several treatment stills separately, particularly when using pressure condensation on the vapors and gases from the high pressure treatment stills, following the practice outlined in my prior application, Serial No. 31,713, referred to above. In either of the modifications wherein residual oil is taken from one still and treated in the next succeeding still, if desired fresh oil may be added thereto before successive treatments.

In Figure 4 there is shown a fragmentary view of a still portion in section showing a baffle arrangement. As there illustrated, the still 200 is provided with the oil inlet 201, and the air inlet 202, while residual oil remaining in the still after the treatment may be withdrawn through the withdrawal pipe 203. Baffles 204 are arranged in this still in the liquid layer to delay the upward travel of the air bubbles, and to prolong the contact of the entering air with the oil.

The following specific example is given to illustrate the invention as applied to a typical petroleum oil, but it will be understood that this specific form is merely illustrative and not limiting, since many changes may be made therein by those skilled in the art without departing from the spirit and scope of this invention. However, this example will illustrate the products that may be obtained in carrying out this process.

The hydrocarbon used was a Mid-Continental gas oil containing about one percent of sulphur and having the following characteristics:

Gravity at 60° F. was 38.3° Bé.

| Distillation | Oil | Vapor |
|---|---|---|
| | °F. | °F. |
| Initial boiling point | 552 | 432 |
| Temp. 10% distilling | 582 | 525 |
| Temp. 20% distilling | 600 | 558 |
| Temp. 30% distilling | 615 | 575 |
| Temp. 40% distilling | 631 | 592 |
| Temp. 50% distilling | 645 | 608 |
| Temp. 60% distilling | 661 | 624 |
| Temp. 70% distilling | 671 | 642 |
| Temp. 80% distilling | 701 | 666 |

The still used was a vertical one, four feet in diameter and twenty-six feet high. The air jets were three feet from the bottom of the still. A cooling coil on the head of the still was arranged so that the vapors and gases passing to the condenser were maintained at a temperature of about 315° F. The oil was preheated to 500° F. before the operation of passing in air was begun. The still contents of 23 barrels was maintained during the run. The pressure in the still was approximately atmospheric, the pump pressure being slightly higher in order that the air might overcome the head of oil in the still. After the air was turned into the still, the temperature rose from 500° F. to about 725° F. to 750° F. Distillation was evident soon after the air was turned into the still. The rate of distillation increased as the still and its contents heated up, but after the desired range of temperature was reached, it was kept approximately constant during the run by evident slight manipulation of the entering air, oil and sludge withdrawal. The charging oil used was in part new oil and in part oil that had been separated from the sludge of the previous run. The average input of the still was about 2.6 barrels of oil per hour. The products formed may be briefly summarized as a small amount of carbon dioxide and water, volatile hydrocarbons escaping an ordinary condenser, water soluble organic compounds containing acetaldehyde and solvents boiling up to 80° C., acids and gums, the gasoline distillate, carbon, and some oil which was recovered and returned to the still for further treatment.

The distillate obtained during this test as it runs from the condenser is an emulsion containing some gas, and is referred to hereinafter as "intermediate distillate." It was run into a wooden tank and allowed to stand until a fairly sharp separation into two layers took place. This separation results in the upper layer containing water immiscible substances and the lower layer containing a water solution of organic substances. Since, however, some of the constituents are mutually soluble, there is a distribution of these mutually soluble substances between the two layers. Some of the valuable organic substances found in the lower layer can be obtained from the upper layer by washing the latter with water, the amount of water used being carefully proportioned so as to avoid an undue dilution of the organic material that is sought to be recovered. Washing several times, using from 3 to 10% of water for each washing, effects a satisfactory separation. These water washes from the upper layer are added to the lower layer.

In the typical case given above as an illustration the intermediate distillate was separated into two portions, the upper layer containing the water insoluble crude oxidized distillate and the lower layer containing the water soluble crude oxidized distillate. The following methods used for treating these distillates to recover valuable products therefrom are exemplary only and not limiting in any way.

A portion of the water insoluble crude oxidized distillate was treated with ten percent caustic soda solution in an agitator for about one hour. Acids, phenols, aldehydes, etc., which are present are dissolved, and can be separated from the caustic solution in a variety of ways. Another portion was first treated with a ten percent solution of carbonate of soda to remove the acids, and then with caustic soda to withdraw the aldehydes (as gum) and the phenoloid bodies. In a third portion, the aldehydes were first largely withdrawn by means of a concentrated solution of sodium bisulphite, the other desirable substances being subsequently removed by the use of methods analogous to those set forth above.

Following the treatment with caustic soda the material may be washed with water and then treated with a small portion of sulphuric acid. If strong acid is used it is advantageous to keep the temperature low during such treatment, while with more dilute acid the temperatures may be higher. The crude water insoluble distillate was then distilled in a fire still, although a steam still may be used, the distillate up to 400° F. being separately collected. A further fraction taken between 400° F. and 500° F. may also be utilized.

This fraction up to 400° F. is a gasoline substitute which differs markedly in its properties from the ordinary commercial varieties of gasoline. Such differences are present in both the physical and chemical properties due without doubt to the fact that whereas, in ordinary or cracked gasoline there is little or no oxygen, the gasoline substitute referred to above contains oxygen, which may amount to 3% or more. It has a characteristic odor. Further, this motor fluid will stand a high compression in the motor cylinder without premature ignition. It is also readily soluble in ordinary 95% alcohol in all proportions and can be mixed with ordinary gasoline, benzol, acetone, and organic liquids in general. Blended fuels may thus be made. The residue remaining in the still after removal of the volatiles therefrom in this treatment of the motor distillate, is desirably returned to the oxygenation still for retreatment.

The sulphuric acid material derived as set forth above is substantially different in its properties from the acid sludges obtained by treating ordinary petroleum and its distillates. This is due to the presence of alcohol in the crude oxidized distillates insoluble in water, which alcohol combined with sulphuric acid in a manner different from that of the unsaturated substances predominating in straight petroleum distillates. This novel sulphuric acid sludge is diluted with water and steam stilled. The alcohols which are distilled off and the organic residue that remains in the still may both be utilized.

Other methods for treating the crude water insoluble oxidized distillate may be used. For example, this so called "motor distillate" may be purified by passing it through fuller's earth, silica gel or heated bauxite. Or in another method of treatment the distillate may be redistilled with aluminum chloride. Or again in order to separate aldehydes particularly, the distillate after treatment with sodium carbonate and sometimes after the caustic soda treatment, may be distilled with anoline in amount equal to 5% for example, or with phenol, either being used in any required proportion.

The water soluble crude oxidized distillate was separated as set forth above, from the water immiscible content of the intermediate distillate. This water solution of organic substances was found to contain approximately 18% of organic material containing, for the most part, acids, including acetic and indications of dibasic acids; aldehydes, including acetaldehyde and propionaldehyde; ketones, including acetone; and both saturated and unsaturated alcohols. This water solution is treated as follows: It is distilled in a copper still provided with a high fractionating column, a number of fractions being taken ranging in boiling point from about 20° C. to 95° C. The first several fractions are practically pure aldehyde, while the last fraction contains considerable water. The intermediate fractions ranging in boiling point up to 85° C. contain only small amounts of water. These distillates are rather complex and have been found to contain aldehydes, ketones, alcohols, and acids, as well as unsaturated compounds and compounds formed by interaction and combination of the substances just mentioned above. Acetaldehyde is readily separated by distillation. The latter fractions are treated with caustic soda solution and redistilled. The caustic soda acts to fix the aldehydes and acids and perhaps other substances, leaving a resultant "white solvent" of boiling point range from 45° C. to 85° C. This white solvent is the principal component of the organic matter present in the original water solution of organic substances obtained from the intermediate distillate. It is a clear, transparent liquid, with a pleasant odor. It mixes in all proportions with water, alcohol, ether, benzol, and petroleum. It mixes with gasoline in all proportions and gives to the latter anti-knocking properties. It also mixes with kerosene and reduces its knocking properties in the motor. This "white solvent" or fractions thereof, is a solvent for shellac, gums, nitro-cellulose and cellulose esters in general, and when the alcohols present are combined with organic acids the solvent properties are improved for many purposes. The "white solvent" or fractions thereof can also be used for the extraction of fats and medicinal principles.

The neutral or alkaline still residue remaining after the "white solvent" separation, was treated with sulphuric acid until acid whereupon substances combined or dissolved by the soda solution were set free. It was then steam stilled and the organic distillate reworked. The residual gummy liquid which is insoluble in water is first washed and then may be combined with aniline or its isomers, hydrazine or its isomers, phenol or its isomers, or a combination of them, in either acid or alkaline condition. The gummy liquid if dried and subjected to heat treatment can be used for making gums of varying hardness as may be desired. The gum can also be used in admixture with other gums and substances.

A portion of the caustic soda used in the treatment of the crude oxidized distillate insoluble in water was also worked up by acidifying it and steam stilling it. The distillate contains the volatile fatty acids and phenoloid bodies from which the fatty acids are readily separated by carbonate of soda. The residual gummy substance which remains is utilized in the same manner as the gummy liquid obtained from the water solution referred to above.

The oil which is withdrawn from the main treatment still during the oxygenation and disintegration and any residue in the still contains oxygenated derivatives and may be worked up to separate such derivatives, for example, fatty acids, but it is found to be more desirable to return such residual oil or other residues to the still for retreatment.

The various factors set forth above for controlling the character of the distillate are easily adjusted so that the "run back" of the still is reduced to a minimum. The process may be made practically continuous. The carbon formed during the process may be withdrawn from the bottom of the still from time to time, generally once an hour, and oil supplied continuously. The position of the air nozzle controlling the point of entry of the air into the liquid hydrocarbon undergoing treatment is one factor affecting the recovery of carbon from the still. For example, the further the nozzle is placed from the bottom of the still, the less is the circulation caused in the oil by the incoming air. When placed about three feet above the bottom of the still, there is a zone of quiescence in which the carbon formed during the process may accumulate. However, when placed about eighteen inches above the bottom of the still, the oil is in circulation throughout substantially all portions thereof, with the result that carbon is prevented from depositing, and is kept in substantial suspension in the oil undergoing treatment, with the residues of which it may be subsequently withdrawn from the still.

In general, it should be noted that the process of oxygenation and disintegration herein set forth is essentially different in character from the cracking processes, etc., heretofore known to the art. The products produced in the instant process strikingly emphasize this differentiation. Many such products, for example, the effluent gases, are note-worthy in that they contain substantially no hydrocarbon or hydrocarbon derivatives if proper methods of condensation have been used, but such gases contain substantially nothing but nitrogen and the oxides of carbon. Furthermore, in the present process, it is possible to obtain yields of more than 100% based on the treated oil since there is a combination of oxygen during the treatment.

While the process as set forth above is exemplified by the treatment of hydrocarbon material, such material may be given a chemical treatment to produce chlorinated, nitrated, sulphated or other derivatives in such material before subjecting it to the oxidation process referred to above.

In utilizing the vapors and gases which are swept out of the oxidation and disintegration chamber by the current of deoxygenated air, or in other ways, the typical example as given above makes use of condensation. During the working up of some of the products obtained from this intermediate distillate by means of distillation sub-processes it is sometimes found to be desirable to use condensers supplied with brine instead of with water.

And while, as set forth above, condensation is one desirable method of treating these vapors and gases from the oxidation zone, they may also be treated advantageously by other methods, either chemical, physical, or both, in order to produce valuable products therefrom. For example, they may be subjected to temperature treatments of various kinds; or they may be treated with absorbents or materials such as fuller's earth, bauxite, or silica gel, etc.; or again, they may be treated chemically to remove or to modify the components, or some of them only, of the gases and vapors. Such treatments may be applied both before and after condensation, and either to the entire gaseous and vaporous product, or to selected portions thereof.

Further, the gases and vapors may be subjected to the action of a distilling head which acts either as a preheater or to return all or a portion of the material to the still for further treatment, or to a supplementary still or vessel for supplementary treatment.

The chemical and physical treatments set forth above may be carried out in towers under superatmospheric pressure, if desired. Bubble towers may also be used.

Having thus set forth my invention, I claim:

1. The process of decomposing hydrocarbon materials in a substantially liquid state, which comprises heating a flowing stream of the liquid to a temperature of about 300 to 700° F., passing the heated liquid into the first of a series of interconnected converting vessels, the pressure in at least one of the vessels being not above atmospheric, to form a considerable depth of liquid therein, introducing a free oxygen containing gas into each vessel at such point in the liquid as to effect substantially complete deoxygenation of the gas, preventing loss of heat from the vessels to maintain temperatures of about 750° F. or higher therein, removing the generated vapors and condensing therefrom the less volatile constituents, returning the condensate to a converting vessel to undergo further decomposition, and withdrawing residual liquid from the bottom of the last vessel.

2. The process of decomposing hydrocarbon materials in a substantially liquid state, which comprises heating a flowing stream of the liquid, continuously passing the heated liquid into the first of a series of interconected converting vessels, at least one of said vessels being maintained under a pressure not above atmospheric, to form a considerable depth of liquid therein, effecting a flow of the liquid from the first to the succeeding vessels, introducing a free oxygen containing gas into each vessel at such point in the liquid as to effect substantially complete deoxygenation of the gas, preventing loss of heat from the vessels to maintain temperatures of about 750° F. or higher therein, continuously removing the generated vapors and condensing therefrom the less volatile constituents, continuously returning the condensate to a converting vessel to undergo further decompositon, and withdrawing residual liquid from the bottom of the last vessel.

3. The process of decomposing hydrocarbon materials in a substantially liquid state, which comprises heating a flowing stream of the liquid to a temperature of about 300 to 700° F., passing the heated liquid into the first of a series of interconnected converting vessels under substantial super-atmospheric pressure, to form a considerable depth of liquid therein, introducing a free oxygen-containing gas into each vessel at such point in the liquid as to effect substantially complete deoxygenation of the gas, preventing loss of heat from the vessels to maintain temperature of about 750° F. or higher therein, removing the generated vapors and condensing therefrom the less volatile constituents, returning the condensate to a converting vessel to undergo further decomposition, and withdrawing residual liquid from the bottom of the last vessel.

4. The process of decomposing hydrocarbon materials in a substantially liquid state, which comprises heating a flowing stream of the liquid to a temperature of about 300 to 700° F., continuously passing the heated liquid into the first of a series of interconnected converting vessels under substantial superatmospheric pressure, to form a considerable depth of liquid therein, introducing a free oxygen containing gas into each vessel at such point in the liquid as to effect substantially complete deoxygenation of the gas, preventing loss of heat from the vessels to maintain temperatures of about 750° F. or higher therein, continuously removing the generated vapors and condensing therefrom the less volatile constituents, continuously returning the condensate to a converting vessel to undergo further decomposition, and withdrawing residual liquid from the bottom of the last vessel.

5. The process of decomposing hydrocarbon materials in a substantially liquid state, which comprises heating a flowing stream of the liquid, continuously passing the heated liquid into the first of a series of interconnected converting vessels under substantial super-atmospheric pressure, to form a considerable depth of liquid therein, effecting a flow of the liquid from the first to the succeeding vessels, introducing a free oxygen containing gas into each vessel at such point in the liquid as to effect substantially complete deoxygenation of the gas, preventing loss of heat from the vessels to maintain temperatures of about 750° F. or higher therein, continuously removing the generated vapors and condensing therefrom the less volatile constituents, continuously returning the condensate to a conversion vessel to undergo further decomposition, and withdrawing residual liquid from the bottom of the last vessel.

6. The process of decomposing hydrocarbon materials in a substantially liquid state, which comprises heating a flowing stream of the liquid to a temperature of about 300 to 700° F., continuously passing the heated liquid into the first of a series of interconnected converting vessels under substantial superatmospheric pressure, to form a considerable depth of liquid therein, supplying enough additional heat to each vessel to raise the temperature to about 750° F. or higher through means of the exothermic reaction of a free oxygen containing gas with the hydrocarbon material, removing the generated vapors and condensing therefrom the less volatile constituents, continuously returning the condensate to a converting vessel to undergo further decomposition, and withdrawing residual liquid from the bottom of the last vessel.

7. The process of decomposing hydrocarbon materials in a substantially liquid state, which comprises heating a flowing stream of liquid to a temperature of about 300 to 700° F., continuously passing the heated liquid into the first of a series of interconnected heat insulated converting vessels under substantial super-atmospheric pressure, introducing a free oxygen containing gas into each vessel to react exothermically with the hydrocarbon material therein, whereby enough additional heat is supplied to each vessel to raise the temperature to about 750° F. or higher, removing the generated vapors and condensing therefrom the less volatile constituents, and cyclically returning the condensate while still under pressure for further treatment.

8. The process of decomposing hydrocarbon materials in a substantially liquid state, which comprises heating a flowing stream of the liquid charge, passing it into the first of a series of interconnected converting vessels maintained under substantial superatmospheric pressure, introducing a free oxygen containing gas into each vessel to react exothermically with the hydrocarbon material therein, but only in such limited quantity as to prevent the evolution of substantial amounts of fixed hydrocarbon gases therefrom, supplying sufficient additional heat in the heating of the charge to maintain the temperature of the material in the vessels at 750° F. or higher, removing the generated vapors and condensing therefrom the less volatile constituents, returning the hot condensate to a converting vessel without further heating to undergo further decomposition therein, and withdrawing residual liquid from the bottom of the vessel.

9. The process of decomposing hydrocarbon materials in a substantially liquid state, which comprises heating a flowing stream of the liquid charge, passing it into the first of a series of interconnected converting vessels maintained under substantial superatmospheric pressure, introducing a free oxygen containing gas into each vessel to react exothermically with the hydrocarbon material therein, but only in such limited quantity as to prevent the evolution of substantial amounts of fixed hydrocarbon gases therefrom, supplying sufficient additional heat in the heating of the charge to maintain the temperature of the material in the vessels at 750° F. or higher, removing the generated vapors and condensing therefrom constituents less volatile than motor fuel, returning the hot condensate to a converting vessel without further heating to undergo further decomposition therein, and withdrawing residual liquid from the bottom of the vessel.

WILLIAM B. D. PENNIMAN.